(12) United States Patent
Schmack et al.

(10) Patent No.: US 10,440,357 B2
(45) Date of Patent: Oct. 8, 2019

(54) SYSTEM AND METHOD FOR DETERMINING AN IMAGING DEVIATION OF A CAMERA

(75) Inventors: Andreas Schmack, Leonberg (DE); Uwe Apel, Neckartailfingen (DE)

(73) Assignee: Robert Bosch GmbH, Stuttgart (DE)

( * ) Notice: Subject to any disclaimer, the term of this patent is extended or adjusted under 35 U.S.C. 154(b) by 220 days.

(21) Appl. No.: 14/131,161

(22) PCT Filed: Jun. 13, 2012

(86) PCT No.: PCT/EP2012/061144
§ 371 (c)(1),
(2), (4) Date: Mar. 25, 2014

(87) PCT Pub. No.: WO2013/004458
PCT Pub. Date: Jan. 10, 2013

(65) Prior Publication Data
US 2014/0204220 A1    Jul. 24, 2014

(30) Foreign Application Priority Data
Jul. 5, 2011 (DE) .................. 10 2011 078 631

(51) Int. Cl.
*H04N 17/02* (2006.01)
*H04N 17/00* (2006.01)
(Continued)

(52) U.S. Cl.
CPC .......... *H04N 17/002* (2013.01); *G02B 27/62* (2013.01); *G03B 43/00* (2013.01)

(58) Field of Classification Search
USPC ........................................ 348/180, 187, 188
See application file for complete search history.

(56) References Cited

U.S. PATENT DOCUMENTS 4,575,124 A * 3/1986 Morrison ...................... 283/115
5,495,429 A * 2/1996 Craven ...................... G01J 3/10
382/157

(Continued)

FOREIGN PATENT DOCUMENTS

DE    19815106    10/1998
DE    19962997    6/2001
(Continued)

OTHER PUBLICATIONS

International Search Report for PCT/EP2012/061144, dated Sep. 14, 2012.
(Continued)

*Primary Examiner* — Jefferey F Harold
*Assistant Examiner* — Humam Satti
(74) *Attorney, Agent, or Firm* — Norton Rose Fulbright US LLP; Gerard Messina

(57) ABSTRACT

A system is described for determining an imaging deviation of a camera having: the camera, which is focused on a first distance, having a target pattern unit, which is situated at a second distance from the camera in a field of view of the camera and which has a three-dimensional surface texture having calibration markings, having a lens unit which is situated at a third distance from the camera and between the target pattern unit and the camera and is developed so that the three-dimensional surface texture is able to be imaged by the camera, and having a control unit that is connected to the camera and which is developed so that the imaging deviation of the camera is determinable by evaluating an image taken of the calibration markings of the three-dimensional surface texture. Also described is a method for determining an imaging deviation of a camera.

24 Claims, 3 Drawing Sheets

(51) Int. Cl.
*G02B 27/62* (2006.01)
*G03B 43/00* (2006.01)

(56) References Cited

U.S. PATENT DOCUMENTS

| | | | |
|---|---|---|---|
| 5,617,257 | A | 4/1997 | Sheehy et al. |
| 5,642,441 | A * | 6/1997 | Riley ................. G01M 11/0242 |
| | | | 356/123 |
| 5,990,935 | A | 11/1999 | Rohlfing |
| 7,477,838 | B2 * | 1/2009 | Lee ........................ G03B 15/02 |
| | | | 348/188 |
| 8,174,585 | B2 * | 5/2012 | Suzuki ................. H04N 1/6055 |
| | | | 345/600 |
| 2004/0066454 | A1 * | 4/2004 | Otani et al. ..................... 348/188 |
| 2004/0252195 | A1 * | 12/2004 | Lu ............................ G02B 7/02 |
| | | | 348/188 |
| 2006/0098096 | A1 * | 5/2006 | Gupta ..................... H04N 1/401 |
| | | | 348/188 |
| 2007/0280677 | A1 | 12/2007 | Drake et al. |
| 2009/0033926 | A1 | 2/2009 | Haug |
| 2009/0102841 | A1 * | 4/2009 | Clavadetscher ........ G06T 15/20 |
| | | | 345/420 |
| 2009/0161945 | A1 * | 6/2009 | Morgan-Mar ....... G06K 9/3216 |
| | | | 382/154 |
| 2010/0020180 | A1 * | 1/2010 | Hill et al. ....................... 348/188 |
| 2011/0026014 | A1 * | 2/2011 | Mack ..................... G03B 13/22 |
| | | | 356/124 |
| 2011/0228102 | A1 * | 9/2011 | Hashi et al. ................... 348/187 |
| 2011/0242331 | A1 * | 10/2011 | Cieslinski ..................... 348/187 |
| 2011/0285879 | A1 * | 11/2011 | Hatakeyama ........... G06T 5/003 |
| | | | 348/241 |

FOREIGN PATENT DOCUMENTS

| | | |
|---|---|---|
| EP | 1376051 | 1/2004 |
| EP | 1394501 | 3/2004 |
| JP | 11-41629 | 2/1999 |
| JP | 2001-36799 | 2/2001 |
| JP | 2001082941 | 3/2001 |
| JP | 2001-99711 | 4/2001 |
| JP | 2003-85542 | 3/2003 |
| JP | 2005-3463 | 1/2005 |
| JP | 2006-30816 | 2/2006 |
| JP | 2006-145755 | 6/2006 |
| JP | 2007-528161 | 10/2007 |
| JP | 2008-82844 | 4/2008 |

OTHER PUBLICATIONS

Zhang: "A Flexible New Technique for Camera Calibration", IEEE Transactions on Pattern Analysis and Machine Intelligence, vol. 22, No. 11, 2000, pp. 1330-1334.

* cited by examiner

SYSTEM AND METHOD FOR DETERMINING AN IMAGING DEVIATION OF A CAMERA

FIELD OF THE INVENTION

The present invention relates to a system and a method for determining an imaging deviation of a camera.

BACKGROUND INFORMATION

European Patent No. 1 376 051 B1 describes the calibration of an image sensor system on a motor vehicle using a calibration object and a position reference sensor. The method described there for calibrating an image sensor system, which is preferably located on a motor vehicle, uses at least one test image, the image sensor system taking the test field, and the test field taken being used for the calibration; the test field having calibration reference features having a known spatial geometric system and the image sensor system taking the calibration reference features.

German Published Patent Appln. No. 199 62 997 A1 describes a method for calibrating a sensor system, using which the recording and evaluation of objects in the track routing of a vehicle is described. In this method, characteristic data of the objects are recorded and the data, which are interpreted as stationary or quasi-stationary objects, taking into account the vehicle's own motion, are sent to a calibration unit. The deviations in the data measured currently from data provided by a model of the objects are ascertained as an error vector in the calibration unit and used to correct the data of the model for the purpose of minimizing the deviation.

German Patent No. 198 15 106 B4 describes a method for measuring camera properties and lens properties for camera tracking, at least one virtual object being positioned in it relative to at least one actual object in combined images of an actual surroundings and virtual surroundings including the steps that the palpation settings of the camera and the lens are selected, that the real environment is photographed by the camera and the lens and a first video signal, which represents the real environment, is transmitted to a common display device, the real environment including at least one real scale.

Fixed-focus lenses have a fixed focus that have an unchangeable distance setting. It is a well-known approach to focus cameras with fixed-focus lenses on the so-called hyperfocal distance. Such focusing is distinguished in that the depth of the field range is between infinity and one-half the hyperfocal distance. The hyperfocal distance is calculated from the focal length of the lens used in the camera, the diameter of the acceptable circle of confusion in the image plane and the f-number. Typical values of the hyperfocal distance for automotive cameras are in the range between 4 m and 11 m. Such distances cannot be implemented meaningfully in a test device in the production environment.

SUMMARY

The present invention creates a system for determining a deviation of a camera image and a method for carrying out the same.

According to the present invention, a system is defined for determining an imaging deviation of a camera using a camera which is focused on a first distance, having a target pattern unit which is situated at a second distance from the camera in the field of view of the camera and which has a three-dimensional surface texture having calibration markings. Furthermore, the system includes a lens unit which is situated at a third distance from the camera and between the target pattern unit and the camera, and is developed so that the three-dimensional surface texture is able to be imaged by the camera and having a control unit that is connected to the camera and which is designed so that the imaging deviation of the camera is determinable by the evaluation of an image taken of the calibration markings of the three-dimensional surface texture.

According to the present invention, a method is defined for determining an imaging deviation of a camera, including focusing a camera on a first distance, positioning a target pattern unit having a three-dimensional surface texture and having calibration markings at a second distance from the camera, and inserting a lens unit situated at a third distance from the camera for imaging the surface texture by the camera. Furthermore, the method includes taking an image of the calibration markings of the three-dimensional surface texture by the camera and determining the imaging deviation of a camera by a control unit by evaluating the image taken.

The present invention ensures that cameras, which are used in driver assistance systems, are focused in such a way that the depth of the field range reliably covers the distance range for the function. The idea on which the present invention is based is that, by imaging objects both at a great distance and those at a short distance, a sufficiently good calibration of the camera is able to be achieved. This should also be verified for the image regions lying apart in the subregions of the image since, conditioned upon tolerances occurring during production and conditioned upon a faulty characteristic of the lens, the image plane is not able to be aligned in parallel to the surface of the image sensor. Moreover, it should be taken into account that the modulation transfer function of the lens is a function of the image height, and that it typically clearly decreases from the photo center all the way to the edge.

Both for the adjustment of the focal position in the production process and in the final test of sharpness, the present invention enables a suitable test method which makes possible a determination of the achievable contrast in the imaging of objects from various distances. Using the lens unit, a test chart, that is located at a shorter distance, is able to be imaged at maximum sharpness by a camera focused at a greater working distance. The size of the test chart may thereby be reduced to a manageable measure.

The idea of the present invention provides that, instead of enabling the otherwise flat charts having test patterns, which enable a contrast determination, one should build up a subdivided test chart which provides test fields at various object distances for the camera to be measured. The aim, in this context, is to be able to carry out the testing in as few steps as possible. The advantage of this approach is that the resolution of the image, that is in large measure present in the newer cameras, is able to be used to achieve as great as possible a test coverage of the field testing.

According to one advantageous refinement of the present invention, a deviation of a depth of field and/or a focus position is determinable as the imaging deviation of the camera.

According to a further advantageous refinement of the system, a pitch deviation and/or a yaw deviation and/or a roll deviation of the camera is determinable as the imaging deviation of the camera.

According to another advantageous refinement of the system, an imaging error and/or a spherical aberration and/or an astigmatism and/or a field curvature is determinable as the imaging deviation.

According to one further advantageous refinement of the system, the system includes a light source which is developed so that the calibration markings are able to be illuminated reflectively, transflectively or transmissively.

According to a further advantageous refinement of the system, the wavelength of the light source is tunable.

According to yet another advantageous refinement of the system, the image of the calibration markings may be taken by light having different wavelengths, and the imaging deviation of the camera is determinable as a function of a wavelength.

According to another advantageous refinement of the system, the lens unit is designed as an optical component having a variable focal length, and the focal length of the optical component is controllable by the control unit.

According to still another advantageous refinement, the calibration markings are developed as stripe patterns having different strip widths and/or as squares having a different orientation and/or as alphanumeric symbols.

This enables, in an advantageous manner, the identification of the calibration markings and a simplified evaluation of the image taken of the calibration markings.

According to an advantageous refinement of the method, a pitch deviation and/or a yaw deviation and/or a roll deviation of the camera is determined as the imaging deviation of the camera.

According to another advantageous refinement of the method, an imaging error and/or a spherical aberration and/or an astigmatism and/or a field curvature is determined as the imaging deviation.

According to yet another advantageous refinement of the method, the image of the calibration markings is taken by light having different wavelengths, and the imaging deviation of the camera is determined as a function of a wavelength. In an advantageous manner, this makes it possible to determine optical imaging errors of the camera as a function of the wavelength.

DETAILED DESCRIPTION

Unless stated otherwise, identical or functionally equivalent elements, features and components have been provided with the same reference symbols.

It is understood that components and elements in the figures are not necessarily depicted true to scale with respect to one another for reasons of clarity and comprehensibility.

Figure 1:
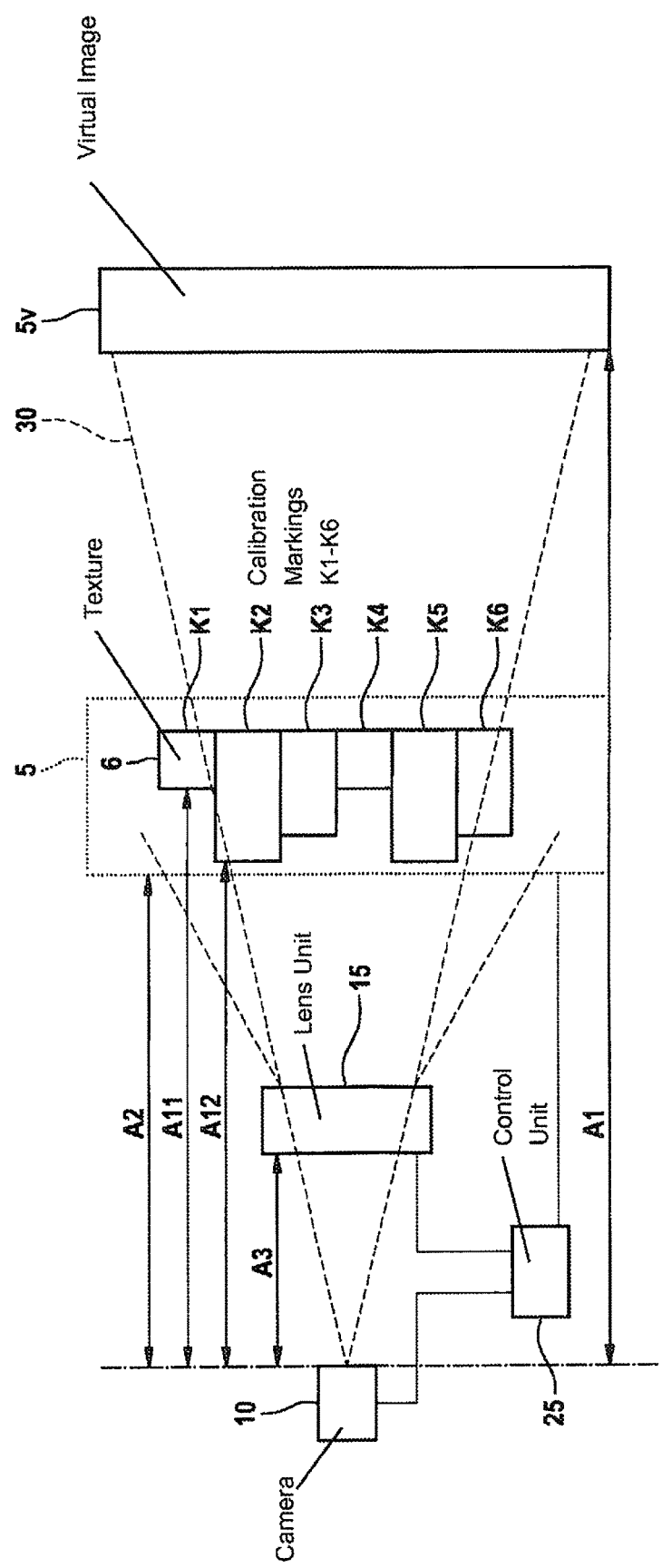
FIG. 1 shows a schematic representation of a first specific embodiment of the system.

FIG. 1 shows the essential components of a system according to a first specific embodiment of the system.

A system includes a camera 10, a target pattern unit 5, a lens unit 15 and a control unit 25. Camera 10 is focused on a first distance A1. Target pattern unit 5 is situated at a second distance A2 to camera 10 in a field of view 30 of camera 10. Target pattern unit 5 has a three-dimensional surface texture 6, for example, having calibration markings K1-K6. Even though the system described has six calibration markings, the system is not limited to this number, but more or fewer calibration markings may be used.

Lens unit 15 is situated at a third distance A3 from camera 10, between target pattern unit 5 and camera 10, and it permits sharply imaging three-dimensional surface texture 6 using camera 10, although the camera is not focused on target pattern unit 5 since, because of lens unit 15, a virtual image 5v of target pattern unit 5 is produced in field of view 30 of camera 10. The virtual image 5v of target pattern unit 5 is generated at a distance A1 from camera 10, and is therefore able to be imaged by camera 10 that is focused at the same distance A1.

Control unit 25 is connected to camera 10 and lens unit 15. Control unit 25 permits control of the camera functions of camera 10 and processing of the image data. Control unit 25 is based on an arithmetic unit having a suitable camera interface for the real time data transmission. Control unit 25 also has software, for example, for the camera control and for image data acquisition and for image data processing and for the determination of deviation.

In order to carry out different so-called through-focus scans, which include determining the depth of field over a certain focus range, the respective focus position of lens unit 15 may be varied, so as to achieve a comparably good determination of the depth of field of camera 10.

Lens unit 15 is designed, for instance, as an optical component having a variable focal length, and the focal length is controllable by control unit 25. Furthermore, control unit 25 is used for image analysis and the determination of deviations of camera 10. The images taken by camera 10 are analyzed by control unit 25 using image recognition algorithms.

As target pattern unit 5, on three-dimensional surface texture 6, either the stripe patterns known from the USAF charts (also USAF resolution test charts) of various line pair widths or even squares set slantwise according to the evaluation methods proposed in ISO 12233 may be applied. Target pattern unit 5 may be illuminated either from the camera side, that is, designed reflectively, or embodied to be transmissive, and be illuminated from the rear of the individual calibration markings K1-Kn.

The calibration markings K1-K6 are developed as stripe patterns having different strip widths and/or as squares having different orientation and/or as other geometric forms and/or as alphanumeric symbols. Calibration markings K1-K6 are imaged by camera 10 and yield a calibration pattern which fills up the camera image of camera 10.

For the analysis of calibration markings K1-K6, defined coordinate systems or coded calibration markings K1-K6 are used. In an automatic measurement, coding of calibration markings K1-K6 may take place in the form of a binary code which is situated round about the actual calibration markings K1-K6. By a corresponding image processing method, besides the measurement of the image coordinates of calibration markings K1-K6, their identity is also detected and assigned.

Camera 10 is executed, for instance, as a camera used in driver assistance systems. Camera 10 is constructed, for example, in fixed focus mode. Camera 10 may be focused in such a way that the depth of the field ranges reliably cover the distance range relevant to the function of the camera when used in the vehicle. This means that both objects at a great distance, such as 80 m-200 m, and the ones at a shorter distance, such as 3 m-80 m are imaged at a sufficiently good contrast.

The sufficiently good imaging of contrast relationships is also to be verified for the image regions lying apart in the various corners of the image taken by camera 10 since, conditioned upon tolerances in the mounting technique and because of the characteristic of the lens, the image plane may not be aligned in parallel to the surface of the image sensor.

For example, because of lens unit 15, three-dimensional surface texture 6 of target pattern unit 5 may be produced as a virtual image 5v and imaged in this way by camera 10.

Lens unit 15 is designed, for example, as an optically effective component having two light-refracting surfaces, of which at least one surface is arched concavely or convexly.

Furthermore, the lens unit may be designed as an optical component having a variable focal length, and the focal length of the optical component may be controllable by a control unit 25.

Lens unit 15 may produce a virtual image of target pattern unit 5 as an optical image, the camera being focused on virtual image 5v of target pattern unit 5 at a distance of A1.

Target pattern unit 5 is constructed having the three-dimensional surface texture 6. Three-dimensional surface texture 6 has calibration markings K1-K6, which are provided at various object distances A11, A12 for the calibration of camera 10 that is to be measured.

The coding of calibration markings K1-K6 is rotationally invariant, for example. Because of that, the alignment and the position of calibration markings K1-K6 are not important for identification, for the coding is uniquely identifiable for all positions.

Depending on the execution and the coding depth (12 bits or 14 bits), different numbers of various calibration markings K1-K6 are able to be distinguished. For most applications 12-bit codings having a total of up to 147 different numbers is sufficient. The 14-bit version permits distinguishing 516 numbers.

Figure 2:
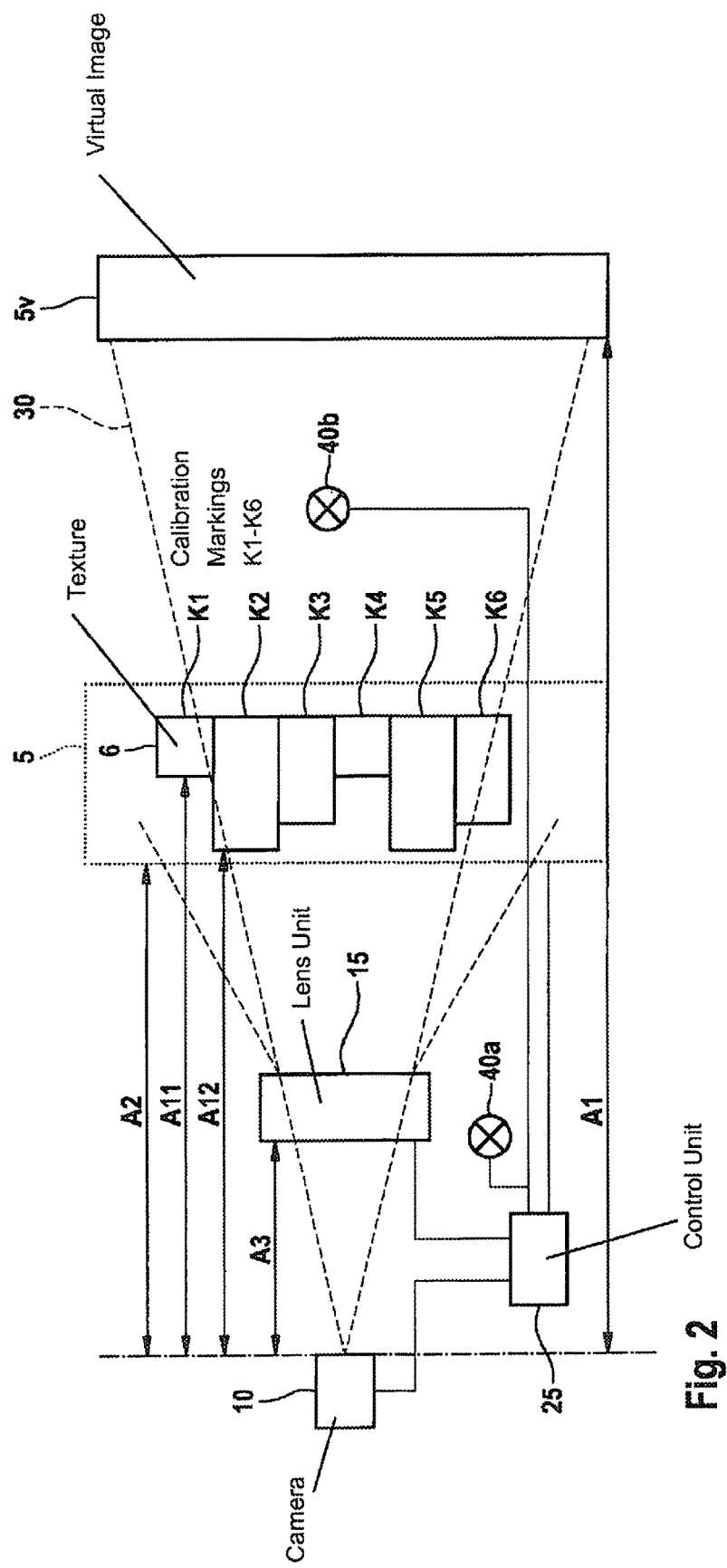
FIG. 2 shows a schematic representation of a second specific embodiment of the system.

FIG. 2 shows the essential components of a system according to a second specific embodiment of the system.

For the camera-side illumination of target pattern unit 5, for example, a light source 40a is developed which is connected to control unit 25. A further light source 40b, which is also connected to control unit 25, enables an illumination from the rear, the individual calibration markings K1-K6 being embodied to be transmissive.

Light sources 40a, 40b are executed, for instance, as tunable light sources in the wavelength emitted, for instance, in the form of color change diodes or other light-emitting diodes. The color tone to be produced by light sources 40a, 40b is able to be set by control 25, in this context.

Further reference numerals of FIG. 2 have been explained in the description of FIG. 1.

Figure 3:
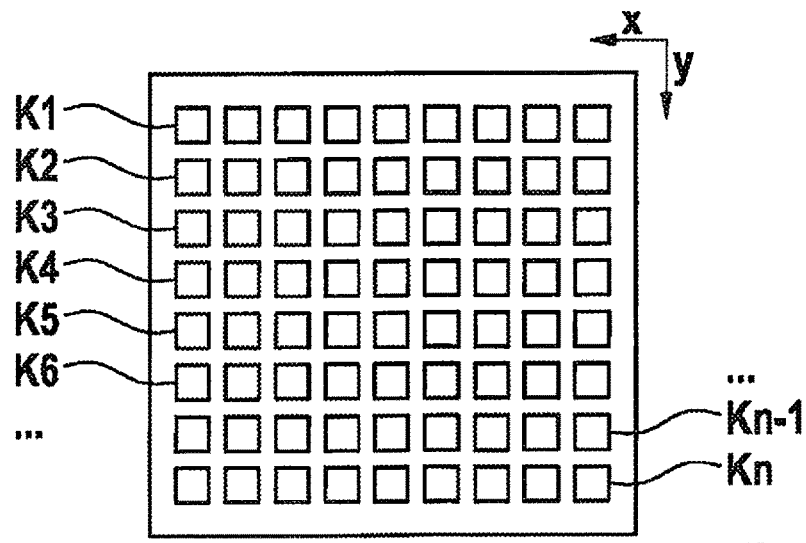
FIG. 3 shows a schematic representation of calibration markings according to one specific embodiment of the present invention.

FIG. 3 shows a schematic representation of calibration markings according to a specific embodiment of the present invention.

Calibration markings K1-Kn are situated, for example, on target pattern unit 5 in the form of a field generated in the y and x direction or a matrix, and have a plurality of different object distances (in the z direction) in the image field of camera 10. One possible subdivision of calibration markings K1-Kn has 5 different object distances, for example, which correspond to virtual distances of 3 m, 5 m, 11 m, 200 m and infinity between camera 10 and virtual image 5v of target pattern unit 5.

By a symmetrical distribution of test fields, which represent object distances in both the near and distant range, using a single test image, one is also able to check for the correct focus position of camera 10 and for a parallel alignment of the image sensor with the image plane.

Figure 4:
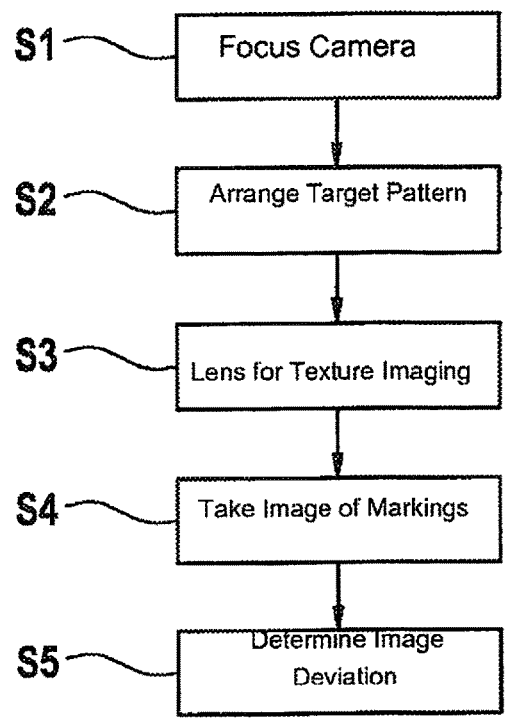
FIG. 4 shows a flow chart showing a specific embodiment of the method.

FIG. 4 shows a flow chart to show a specific embodiment of the method.

The method reproduced in FIG. 4 is able to be executed using the abovementioned system, for example. The ability to implement the method is not, however, limited to the use of the system or a camera calibrating system equipped with it.

In a first method step, focusing S1 of camera 10 on first distance A1 takes place.

In the first method step, for example, of focusing S1, camera 10 may be focused on a hyperfocal distance. The hyperfocal distance is preferably in a range of 25 to 300 m.

In a further method step, there takes place the arranging S2 of a target pattern unit 5 having a three-dimensional surface texture 6 having calibration markings K1-Kn at a second distance A2 from the camera.

In a further message step there takes place the use S3 of a lens unit 15 situated at a third distance A3 from camera 10, for the imaging of the surface texture by the camera.

In a still further method step, there takes place the taking S4 of an image of calibration markings K1-Kn of three-dimensional surface texture 6 by camera 10. In the method step of taking S4, preferably the image of calibration markings K1-Kn is taken by light having different wavelengths, and the imaging deviation of camera 10 is determined as a function of a wavelength.

In the subsequent method step, the determination S5 of the imaging deviation of camera 10 is carried out by control unit 25 by evaluating the image taken. In method step S5, there is preferably determined an imaging deviation of camera 10, a deviation of a depth of field and/or a focal length of camera 10.

Furthermore, as the imaging deviation, one may also determine the pitch deviation and/or the yaw deviation and/or the roll deviation of camera 10. Similarly, as the imaging error, one may determine a spherical aberration and/or an astigmatism and/or a field curvature.

The method permits calibrating camera 10 or additional digital image taking systems or to check them with respect to the presence of deviations.

The designation of method steps S1 to S5 does fix any sequence in time for executing them.

What is claimed is:

1. A system for determining an imaging deviation of a camera, comprising:
   the camera having a camera lens focused on a first distance;
   a target pattern unit situated at a second distance from the camera in a field of view of the camera, wherein the target pattern unit has a three-dimensional surface texture including calibration markings having a known spatial geometric system, and wherein the calibration markings are provided at various object distances for a calibration;
   a lens unit situated at a third distance from the camera and between the target pattern unit and the camera lens, the lens unit being configured so that the three-dimensional surface texture is able to be imaged by the camera; and
   a control unit connected to the camera and configured so that the imaging deviation of the camera is determinable by evaluating an image taken of the calibration markings of the three-dimensional surface texture to check for a correct focus position of the camera and for a parallel alignment of an image sensor with the image plane.

2. The system as recited in claim 1, wherein a deviation of at least one of a depth of field and a focal position of the camera is determinable as the imaging deviation of the camera.

3. The system as recited in claim 1, wherein at least one of a pitch deviation, a yaw deviation, and a roll deviation is determinable as the imaging deviation of the camera.

4. The system as recited in claim 1, wherein at least one of an imaging error, a spherical aberration, an astigmatism, and a field curvature is determinable as the imaging deviation of the camera.

5. The system as recited in claim 1, further comprising:
a light source configured so that the calibration markings are able to be illuminated one of reflectively, transflectively, and transmissively.

6. The system as recited in claim 5, wherein the light source is tunable in a wavelength.

7. The system as recited in claim 1, wherein the image of the calibration markings is able to be taken by light having different wavelengths, and the imaging deviation of the camera is determinable as a function of a wavelength.

8. The system as recited in claim 1, wherein the lens unit includes an optical component having a variable focal length controllable by the control unit.

9. The system as recited in claim 1, wherein the calibration markings are configured at least one of as stripe patterns having different strip widths, as squares having a different orientations, and as alphanumeric symbols.

10. The system as recited in claim 1, further comprising:
a light source configured so that the calibration markings are able to be illuminated one of reflectively, transflectively, and transmissively;
wherein a deviation of at least one of a depth of field and a focal position of the camera is determinable as the imaging deviation of the camera, and wherein the light source is tunable in a wavelength.

11. The system as recited in claim 1, further comprising:
a light source configured so that the calibration markings are able to be illuminated one of reflectively, transflectively, and transmissively;
wherein at least one of a pitch deviation, a yaw deviation, and a roll deviation is determinable as the imaging deviation of the camera, and wherein the light source is tunable in a wavelength.

12. The system as recited in claim 1, further comprising:
a light source configured so that the calibration markings are able to be illuminated one of reflectively, transflectively, and transmissively;
wherein at least one of an imaging error, a spherical aberration, an astigmatism, and a field curvature is determinable as the imaging deviation of the camera, and wherein the light source is tunable in a wavelength.

13. The system as recited in claim 1, further comprising:
a light source configured so that the calibration markings are able to be illuminated one of reflectively, transflectively, and transmissively;
wherein the light source is tunable in a wavelength, and wherein the image of the calibration markings is able to be taken by light having different wavelengths, and the imaging deviation of the camera is determinable as a function of a wavelength.

14. The system as recited in claim 1, further comprising:
a light source configured so that the calibration markings are able to be illuminated one of reflectively, transflectively, and transmissively;
wherein the light source is tunable in a wavelength, and wherein the lens unit includes an optical component having a variable focal length controllable by the control unit.

15. The system as recited in claim 1, further comprising:
a light source configured so that the calibration markings are able to be illuminated one of reflectively, transflectively, and transmissively;
wherein the light source is tunable in a wavelength, and wherein the calibration markings are configured at least one of as stripe patterns having different strip widths, as squares having a different orientations, and as alphanumeric symbols.

16. A method for determining an imaging deviation of a camera, comprising:
focusing the camera on a first distance, wherein the camera includes a camera lens;
arranging a target pattern unit, wherein the target pattern unit has a three-dimensional surface texture having calibration markings having a known spatial geometric system, at a second distance from the camera, wherein the calibration markings are provided at various object distances for a calibration;
inserting a lens unit situated at a third distance from the camera and between the target pattern unit and the camera lens for imaging the three-dimensional surface texture by the camera;
taking an image of the calibration markings of the three-dimensional surface texture by the camera; and
determining the imaging deviation of the camera by a control unit by evaluating the image taken to check for a correct focus position of the camera and for a parallel alignment of an image sensor with the image plane.

17. The method as recited in claim 16, wherein at least one of a deviation of at least one of a depth of field and a focal position of the camera is determined as the imaging deviation of the camera.

18. The method as recited in claim 16, wherein at least one of a pitch deviation, a yaw deviation, and a roll deviation of the camera is determined as the imaging deviation of the camera.

19. The method as recited in claim 16, wherein at least one of an imaging error, a spherical aberration, an astigmatism, and a field curvature is determinable as the imaging deviation of the camera.

20. The method as recited in claim 16, wherein the image of the calibration markings is taken by light having different wavelengths, and the imaging deviation of the camera is determined as a function of a wavelength.

21. A method for determining an imaging deviation of a camera, the method comprising:
focusing the camera on a first distance, wherein the camera includes a camera lens and the camera lens is focused on a hyperfocal distance;
arranging a target pattern unit, wherein the target pattern has a three-dimensional surface texture having calibration markings K1-Kn having a known spatial geometric system, at a second distance from the camera, and wherein the calibration markings are provided at various object distances for a calibration;
imaging, using the camera and using a lens unit situated at a third distance from the camera and between the target pattern unit and the camera lens, the surface texture; and taking an image, using the camera, of the calibration markings K1-Kn of the three-dimensional surface texture;

wherein the imaging deviation of the camera is performed by a control unit which evaluates the image taken by the camera, wherein a deviation of an imaging characteristic of the camera is determined, wherein the determining of the imaging deviation includes determining a movement characteristic of the camera to check for a correct focus position of the camera and for a parallel alignment of an image sensor with the image plane, and wherein an imaging error of the camera is determined.

22. The method of claim 21, wherein:

the hyperfocal distance in a range of 25 m to 300 m, the image of calibration markings K1-Kn is taken by light having different wavelengths, and an imaging deviation of the camera is determined as a function of a wavelength, the deviation includes at least one of a deviation of a depth of field and a focal length of the camera, the movement characteristic of the camera includes at least one of a pitch deviation, a yaw deviation, and a roll deviation, and wherein the imaging error of the camera is based on at least one of a spherical aberration, an astigmatism and a field curvature.

23. The method of claim 21, wherein the hyperfocal distance in a range of 25 m to 300 m, and wherein the image of calibration markings K1-Kn is taken by light having different wavelengths, and an imaging deviation of the camera is determined as a function of a wavelength.

24. The method of claim 21, wherein the deviation includes at least one of a deviation of a depth of field and a focal length of the camera, wherein the movement characteristic of the camera includes at least one of a pitch deviation, a yaw deviation, and a roll deviation, and wherein the imaging error of the camera is based on at least one of a spherical aberration, an astigmatism and a field curvature.

* * * * *